United States Patent
Bae

(10) Patent No.: US 10,927,492 B2
(45) Date of Patent: Feb. 23, 2021

(54) LAUNDRY PROCESSING APPARATUS AND CONTROL METHOD THEREOF

(71) Applicant: LG ELECTRONICS INC., Seoul (KR)

(72) Inventor: Yonggyung Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 282 days.

(21) Appl. No.: 16/073,119

(22) PCT Filed: Jan. 26, 2017

(86) PCT No.: PCT/KR2017/000986
§ 371 (c)(1),
(2) Date: Jul. 26, 2018

(87) PCT Pub. No.: WO2017/131485
PCT Pub. Date: Aug. 3, 2017

(65) Prior Publication Data
US 2019/0032268 A1      Jan. 31, 2019

(30) Foreign Application Priority Data
Jan. 27, 2016 (KR) .......................... 10-2016-0010015

(51) Int. Cl.
*D06F 31/00* (2006.01)
*D06F 39/00* (2020.01)
(Continued)

(52) U.S. Cl.
CPC ............ *D06F 39/006* (2013.01); *D06F 37/04* (2013.01); *D06F 37/22* (2013.01); *D06F 37/304* (2013.01);
(Continued)

(58) Field of Classification Search
None
See application file for complete search history.

(56) References Cited

U.S. PATENT DOCUMENTS

2011/0041258 A1*   2/2011   Ko .......................... D06F 29/00
8/137

FOREIGN PATENT DOCUMENTS

JP    2008-006182       1/2008
JP    2008006182 A  *   1/2008
(Continued)

OTHER PUBLICATIONS

English machine translation of JP2015217063.*
(Continued)

*Primary Examiner* — Michael E Barr
*Assistant Examiner* — Jason P Riggleman
(74) *Attorney, Agent, or Firm* — Ked & Associates LLP

(57) ABSTRACT

The present invention relates to a laundry processing apparatus and a control method thereof. A laundry processing apparatus operated by means of a motor, which has a plurality of washing units for performing washing independently of each other, charges a current generated during braking of a motor provided in each of the first washing unit and the second washing unit in a battery provided therein and uses the charged power at the next driving of the motor, thereby preventing the wasting of energy and reducing energy consumption even when power consumption is increased due to a simultaneous operation of the first washing unit and the second washing unit.

18 Claims, 7 Drawing Sheets

(51) Int. Cl.
*H02J 7/14* (2006.01)
*D06F 37/40* (2006.01)
*D06F 37/22* (2006.01)
*D06F 37/04* (2006.01)
*H02P 3/22* (2006.01)
*H02P 3/18* (2006.01)
*H02P 3/14* (2006.01)
*D06F 37/30* (2020.01)
*H02P 5/74* (2006.01)
*D06F 39/12* (2006.01)
*D06F 29/00* (2006.01)
*H02J 7/00* (2006.01)
*D06F 33/00* (2020.01)

(52) U.S. Cl.
CPC ............... *D06F 37/40* (2013.01); *H02J 7/14* (2013.01); *H02P 3/14* (2013.01); *H02P 3/18* (2013.01); *H02P 3/22* (2013.01); *H02P 5/74* (2013.01); *D06F 29/005* (2013.01); *D06F 31/00* (2013.01); *D06F 33/00* (2013.01); *D06F 39/125* (2013.01); *D06F 2202/12* (2013.01); *D06F 2204/04* (2013.01); *D06F 2204/065* (2013.01); *D06F 2204/10* (2013.01); *D06F 2226/00* (2013.01); *H02J 7/00302* (2020.01); *H02J 7/143* (2020.01); *H02J 7/1423* (2013.01); *H02J 7/1461* (2013.01); *Y02T 10/92* (2013.01)

(56) References Cited

FOREIGN PATENT DOCUMENTS

| | | |
|---|---|---|
| JP | 2015-217063 | 12/2015 |
| JP | 2015217063 | * 12/2015 |
| KR | 10-2000-0051487 | * 8/2000 |
| KR | 10-2011-0019082 | 2/2011 |
| KR | 10-2011-0113097 | 10/2011 |

OTHER PUBLICATIONS

English machine translation of JP2008006182A.*
International Search Report (with English Translation) and Written Opinion dated May 17, 2017 issued in Application No. PCT/KR2017/000986.

* cited by examiner (a)

(b)

LAUNDRY PROCESSING APPARATUS AND CONTROL METHOD THEREOF

CROSS-REFERENCE TO RELATED PATENT APPLICATIONS

This application is a U.S. National Stage Application under 35 U.S.C. § 371 of PCT Application No. PCT/KR2017/000986, filed Jan. 26, 2017, which claims priority to Korean Patent Application No. 10-2016-0010015, filed Jan. 27, 2016, whose entire disclosures are hereby incorporated by reference.

TECHNICAL FIELD

The present invention relates to a laundry processing apparatus having a plurality of washing units, and more particularly, to a laundry processing apparatus operated by means of a motor, and a control method thereof.

BACKGROUND ART

Generally, a laundry processing apparatus is an apparatus that processes laundry through various operations such as laundering, spin-dry and/or drying.

The laundry processing apparatus is an apparatus that supplies water to immerse the laundry, and dissolves an appropriate amount of the detergent in the wash water to remove the impurities from the laundry.

Such a laundry processing apparatus includes a washing machine that washes laundry such as clothing or bedding by using the emulsifying action of the detergent, the water current action caused by the rotation of the tub or the laundry blade, and a mechanical force applied by the laundry blade, a dryer that applies a hot air or a cold air to dry the laundry, and a refresher that removes the crease of the clothes by applying steam. In addition, a washer-drier provides a combination of various functions.

A general laundry processing apparatus should be supplied with a minimum amount of wash water for performing laundering. In the case where a tub having a large capacity is provided, there is a problem in that a large amount of wash water is required even when laundering a small amount of laundry.

In response to this demand, a mini laundry processing apparatus for laundering a small amount of laundry or a laundry processing apparatus for babies has been appeared. Further, there is a tendency to develop a laundry processing apparatus having a plurality of washing units having different capacities.

The laundry processing apparatus is provided with a motor for rotating the tub and controls the rotation of the motor to obtain a washing effect. Particularly, the laundry processing apparatus needs to control the braking of the motor effectively when producing the water current by forward rotation or reverse rotation of the motor and by controlling the rotation speed of the motor. At this time, the current generated when the motor is braked is consumed through a connected resistor, but it is intended that such a current is accumulated and used for starting the motor to cope with an increased power consumption.

DISCLOSURE

Technical Problem

It is an object of the present invention to provide a laundry processing apparatus and a control method thereof, and provide a laundry processing apparatus which has a plurality of washing units for performing washing independently of each other, charges a current generated during braking of a motor and uses the charged power at the driving of the motor, and a control method thereof.

Technical Solution

In an aspect, there is provided a laundry processing apparatus including: a first washing unit which has a first tub and a first motor for operating the first tub; and a second washing unit which has a second tub and a second motor for operating the second tub, and operates independently of the first washing unit, wherein the first washing unit includes: a battery which is charged by a current generated from the first motor, when the first motor is braked; a voltage detection unit which detects a voltage of the battery; a controller which enables the battery to be charged when the first motor is braked, determines a charging state of the battery in response to a voltage detected by the voltage detection unit, and controls charging power of the battery to be supplied to the first motor, when the first and second washing units operate simultaneously; a regeneration driving unit which supplies the current to the battery to charge the battery, or supplies the charging power to the first motor, according to a control command of the controller; and a motor driving unit which receives commercial power or the charging power to operate the first motor according to the control command of the controller.

The controller controls the commercial power to be supplied to the first motor when the voltage of the battery is less than a set voltage in response to the voltage of the voltage detection unit.

The controller stops the charging of the battery when it is determined that the battery is in an overcharged state in response to the voltage of the voltage detection unit.

The regeneration driving unit includes: a first switch for supplying any one of the commercial power and the charging power to the first motor in response to the control command of the controller; and a second switch for turning on and off the charging of the battery.

The controller controls the second switch to charge the battery or stop the charging of the battery.

The controller controls the first switch and the second switch such that any one of the charging power and the commercial power is supplied to the first motor as an operating power.

The controller turns on the second switch and turns off the first switch so that the charging power of the battery is supplied to the first motor, and turns off the second switch and turns on the first switch so that the commercial power is supplied to the first motor.

The motor driving unit includes at least one resistor, and the controller turns off the first switch and the second switch, and applies a current generated from the motor to the resistor when the battery is in an overcharged state.

One end of the first switch is connected to a DC link unit of the commercial power and the other end of the first switch is connected to the second switch and the motor driving unit, and one end of the second switch is connected to the battery, and the other end of the second switch is connected to the first switch and the motor driving unit.

The battery is connected to the second motor of the second washing unit, and the controller enables the charging power of the battery to be supplied to any one of the first and second washing units which has an insufficient power when the first washing unit and the second washing unit operate simultaneously.

The second washing unit includes: a second motor driving unit for operating the second motor by using the commercial power or the charging power; and a second controller for controlling the charging power to be supplied to the second motor in response to the control signal received from the controller.

The second washing unit further includes a third switch for enabling any one of the charging power and the commercial power of the battery to be supplied to the motor, and the second controller controls the third switch to select an operating power of the motor.

The second washing unit includes: a second battery which is charged by a current generated from the second motor, when the second motor is braked; a second voltage detection unit which detects a voltage of the second battery; a second controller which enables the second battery to be charged when the second motor is braked, determines a charging state of the second battery in response to a voltage detected by the second voltage detection unit, and enables any one of the commercial power and charging power of the second battery to be supplied to the second motor; and a second motor driving unit which operates the second motor by using an operation power supplied from the commercial power or the charging power of the second battery, and the second controller determines whether the first washing unit and the second washing unit operate simultaneously and supplies the charging power of the second battery to the second motor in response to the control signal received from the controller.

In another aspect, there is provided a method for controlling a laundry processing apparatus laundry processing apparatus including a first washing unit which has a first tub and a first motor for operating the first tub, and a second washing unit which has a second tub and a second motor for operating the second tub and operates independently of the first washing unit, the method including: braking the first motor which is in operation; charging a battery by using a current generated from the first motor; determining a charging state of the battery by measuring a voltage of the battery; supplying a charging power of the battery to the first motor when the voltage of the battery is equal to or higher than a preset voltage and the first washing unit and the second washing unit operate simultaneously; and operating the first motor by the charging power.

Charging a battery includes: turning off a first switch connected to a commercial power and a motor driving unit for driving the first motor to block power supplied to the first motor; turning on a second switch connected to the battery to connect the motor driving unit and the battery; and applying the current generated from the first motor to the battery.

The method further includes turning on the first switch and turning off the second switch to supply the commercial power to the first motor when the voltage of the battery is less than the set voltage.

The method further includes turning off the first switch and the second switch, and applying the current to a resistor connected to the motor driving unit, when the battery is overcharged.

The method further includes supplying the charging power of the battery to the second motor connected to the battery, when the power of the second washing unit is insufficient.

Advantageous Effects

According to a laundry processing apparatus configured as described above and the control method of the present invention, the laundry processing apparatus, which has a plurality of washing units operating independently of each other, charges a current generated during braking of a motor provided in each of the first washing unit and the second washing unit in a battery provided therein and uses the charged power at the next driving of the motor, thereby preventing the wasting of energy and reducing energy consumption even when power consumption is increased due to a simultaneous operation of the first washing unit and the second washing unit.

MODE FOR INVENTION

Hereinafter, preferred embodiments of the present invention will be described with standard to the accompanying drawings. In describing the present embodiment, the same designations and the same standard numerals are used for the same components, and further description thereof will be omitted.

Figure 1:
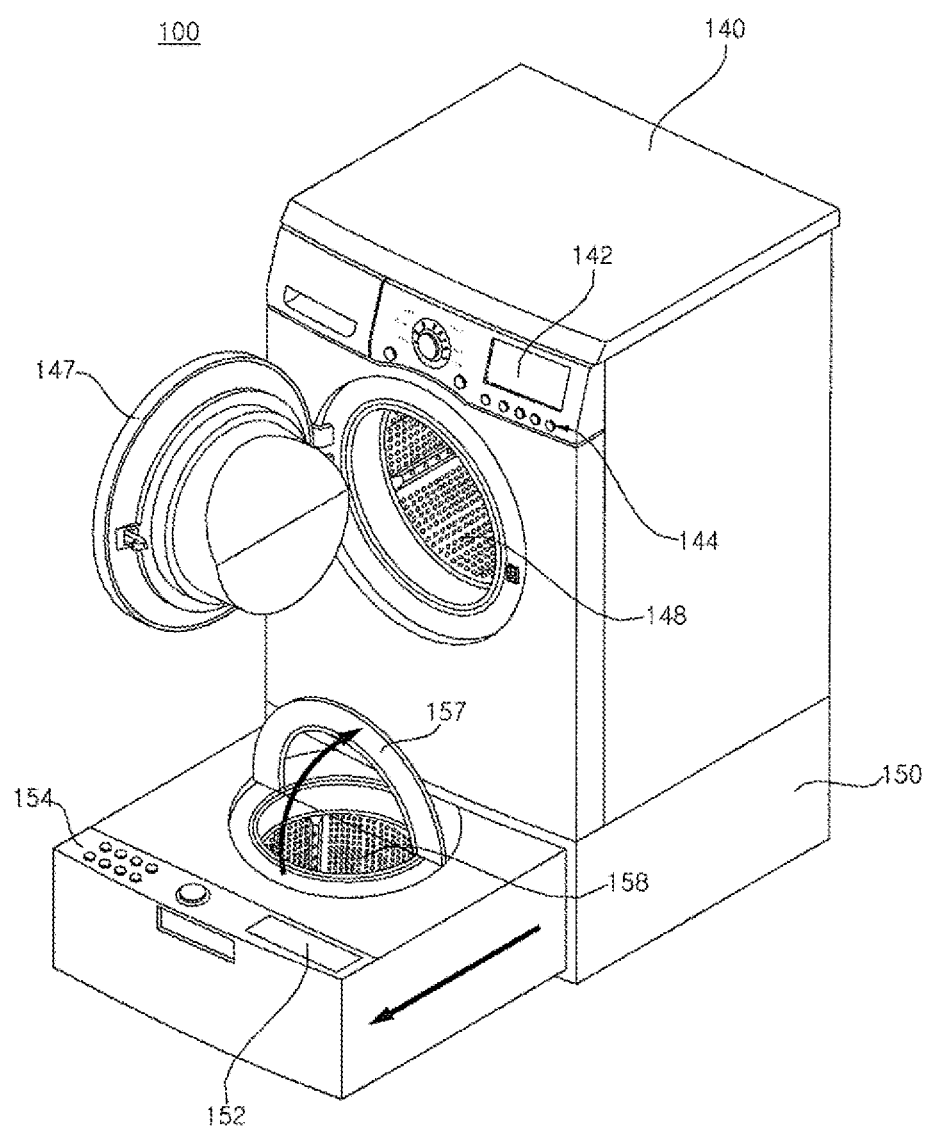
FIG. 1 is a perspective view illustrating a laundry processing apparatus according to an embodiment of the present invention.

FIG. 1 is a perspective view illustrating a laundry processing apparatus according to an embodiment of the present invention.

Referring to FIG. 1, a laundry processing apparatus 100 includes a first washing unit 140 and a second washing unit (motor driving unit).

The first washing unit 140 and the second washing unit 150 are disposed vertically. The first washing unit 140 is disposed above the second washing unit 150, and the first washing unit 140 and the second washing unit 150 can be coupled to and separated from each other.

The first washing unit 140 is in the form of a front load washing machine, and the second washing unit 150 is in the form of a top load washing machine.

The second washing unit 150 has a structure in which it is slidably opened and closed in the front and rear direction like a drawer. When the second washing unit 150 is pulled to the front, the upper end of the second washing unit 150 is exposed. A second input unit 154, a second output unit 152, and a second door 157 are disposed in the upper end of the second washing unit 150.

The first washing unit 140 may include a first input unit 144, a first output unit 142 and a first door 147. The second washing unit 150 may include the second input unit 154, the second output unit 152, and the second door 157.

The first washing unit 140 and the second washing unit 150 are provided with separate input units 144 and 154 and output units 142 and 152, so that a command can be input independently of each other and an operation corresponding to the inputted command can be performed.

The first washing unit 140 and the second washing unit 150 may respectively include a water storage tank for containing water, a tub 148 (first washing unit) which accommodates laundry and is rotatably installed in the water storage tank, a motor for rotating the tub, a water supply device for supplying water into the water storage tank or the tub, and a draining device for draining water in the water storage tank, and perform laundering independently of each other.

It is shown in the drawing that the capacity of the tub of the first washing unit 140 is larger than the capacity of the tub of the second washing unit 150. However, the capacity of the tub of the first washing unit 140 may be equal to or smaller than the capacity of the tub of the second washing unit 150. The tub capacity of each of the washing units 140 and 150 is not limited.

The first washing unit 140 and the second washing unit 150 may be a washer-drier for simultaneously providing a laundering function and a drying function.

Figure 2:
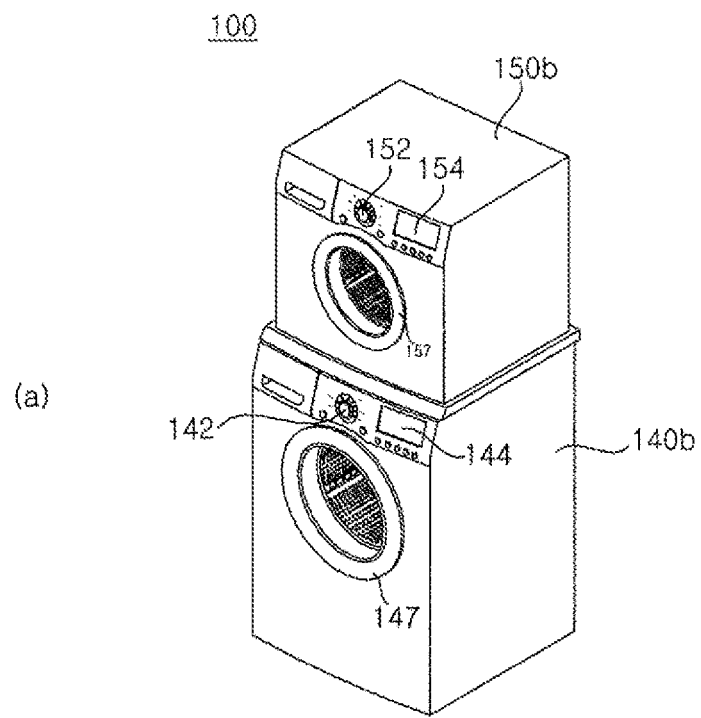
FIG. 2 is a perspective view illustrating a shape of a laundry processing apparatus according to another embodiment of the present invention.
Figure 2:
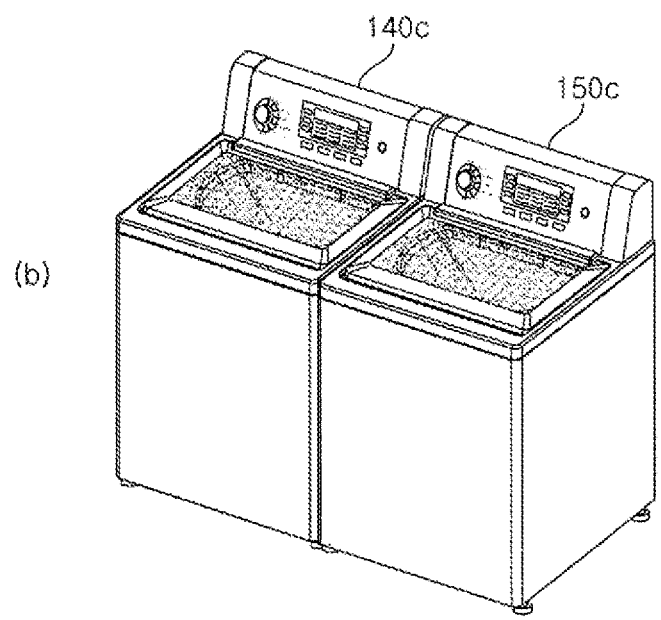

FIG. 2 is a perspective view illustrating a shape of a laundry processing apparatus according to another embodiment of the present invention.

As shown in FIG. 2A, in the laundry processing apparatus, both the first washing unit 140*b* and the second washing unit 150*b* may be in the form of a front load laundry processing apparatus.

In addition, in the laundry processing apparatus, the second washing unit 150*b* may be disposed above the first washing unit 140*a*.

As shown in FIG. 2B, in the laundry processing apparatus, both the first washing unit 140*c* and the second washing unit 150*c* may be in the form of a top load washing machine.

In addition, in the laundry processing apparatus, the first washing unit 140 and the second washing unit 150 may not be disposed vertically, but may be disposed laterally.

Hereinafter, the laundry processing apparatus will be illustrated that, as shown in FIG. 1, the first washing unit 140 and the second washing unit 150 are vertically disposed, but the disposition and form are not limited.

Figure 3:
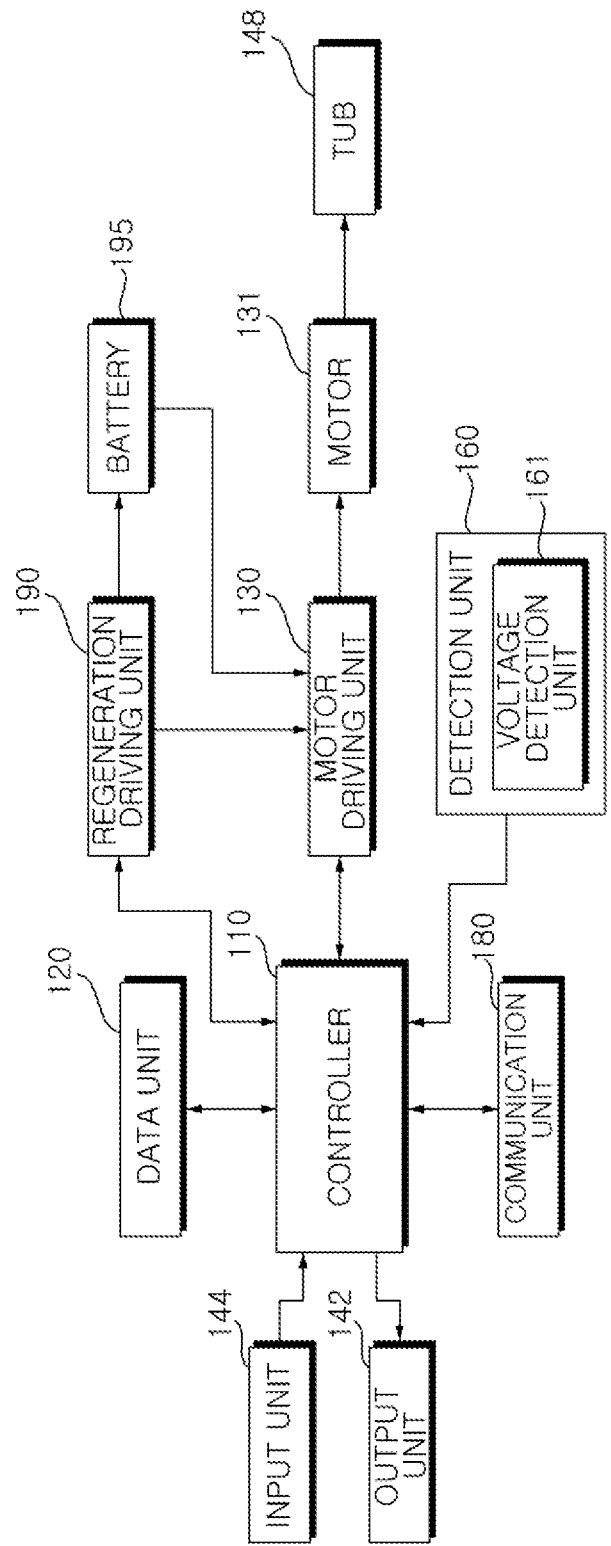
FIG. 3 is a block diagram illustrating a control configuration of a laundry processing apparatus according to an embodiment of the present invention.

FIG. 3 is a block diagram illustrating a control configuration of a laundry processing apparatus according to an embodiment of the present invention.

As shown in FIG. 3, the first washing unit 140 includes an input unit 144, an output unit 142, a tub 148, a motor 131, a motor driving unit 130, a regeneration driving unit 190, a battery 195, a detection unit 160, a data unit 120, and a controller 110 for controlling the overall operation of the first washing unit 140. In addition, the first washing unit 140 further includes a communication unit 180.

In addition, the second washing unit 150 includes a second tub 158, and includes a second motor (not shown), a second motor driving unit (not shown), a second data unit (not shown), a second regeneration driving unit (not shown), a second detection unit (not shown), a second input unit 154, a second output unit 152, and a second controller for performing washing independently of the first washing unit 140. In addition, the second washing unit 150 may further include a separate second battery, or may be connected to the battery 195 of the first washing unit 140.

Hereinafter, the present invention will be described by taking the first washing unit 140 as an example, but the operation of each unit can be identically applied to the second washing unit 150 as well, and a description thereof will be omitted below.

The input unit 144 includes input means such as at least one button, a switch, and a touch pad, and inputs an operation command such as a power input, a washing course, a wash water temperature, and the like. In some cases, the input unit 144 may include a separate key for determining whether the first washing unit 140 and the second washing unit 150 operate simultaneously.

The output unit 142 includes a display unit for displaying information on the operation setting inputted by the input unit 144 and outputting the operation state of the laundry processing apparatus, and includes a speaker, a buzzer, or the like for outputting a certain sound effect or a warning sound.

The data unit 120 stores control data for controlling the operation of the laundry processing apparatus, inputted operation setting data, data on the washing course, and reference data for determining whether an error has occurred in the laundry processing apparatus. In addition, the data unit 120 stores data detected or measured through the detection unit 160 during operation of the laundry processing apparatus and data on transmission/reception with the second washing unit.

The communication unit 180 is connected to the second washing unit 150 in a wired or wireless manner to transmit and receive data. In response to the control command of the controller 110, the communication unit 180 may transmit information about start of washing or operation data, when starting the washing.

The detection unit 160 includes a plurality of sensors, and each sensor measures the voltage or current of the laundry processing apparatus, measures the temperature or the water pressure, and inputs the measured temperature or the water pressure to the controller 110. For example, the detection unit 160 detects the water temperature of the wash water and the water level of the wash water in the tub through the plurality of sensors, and detects the temperature of the heater and the voltage applied to the heater and inputs to the controller 110.

In addition, the detection unit 160 includes a voltage detection unit 161 that measures the voltage of the battery 195. The voltage detection unit 161 measures the voltage of the battery 195 connected to the regeneration driving unit 190 and inputs the measured voltage to the controller 110. The voltage detection unit 161 may be a voltage sensor or a current sensor.

The motor 131 is connected to the tub 148 to allow the tub 148 to rotate. The motor driving unit 130 controls the operation power supplied to the motor 131 so that the motor 131 connected to the tub 148 operates, according to a control command of the controller 110. The motor driving unit 130 controls the rotation direction, the rotation angle, and the rotation speed of the motor 131 according to the setting.

The motor driving unit 130 controls the motor 131 to operate differently according to the set washing course, or the progress of washing, rinsing, spin-dry, and drying. At this time, the motor driving unit 130 differently controls the rotation direction, the rotation angle, and the rotation speed of the motor 131 so that the wash water in the tub 148 forms a certain type of water current.

The regeneration driving unit 190 supplies a commercial power or a charging power of the battery 195 to the motor driving unit 130 and the motor 131, according to the control command of the controller 110. At this time, the regeneration driving unit 190 is connected to the supplied commercial power and the battery 195, and is connected to the motor driving unit 130. The regeneration driving unit 190 is connected to a power supply unit for rectifying and smoothing the commercial power.

The regeneration driving unit 190 operates according to the control command of the controller 110 when the motor 131 is braked such that the current generated from the motor 131 is supplied to the battery 195 through the motor drive unit 130 to charge the battery 195. In addition, the regeneration driving unit 190 stops the charging of the battery 195 according to the control command of the controller 110. The regeneration driving unit 190 includes a plurality of switches that are switched according to the control command of the controller.

The controller 110 applies the control command to the motor driving unit 130 according to the operation setting inputted from the input unit 144 so that the tub 148 rotates to perform washing, and applies the control command to the switch or a heater driving unit (not shown) to operate a heater so that wash water is heated or drying is performed.

The controller 110 controls a series of washing processes of washing, rinsing, spin-dry, and drying.

The controller 110 stores the inputted operation setting in the data unit 120 and outputs the operation setting or operation state through the output unit 142. In some cases, the controller 110 may communicate with the second washing unit 150 through the communication unit 180.

The controller 110 determines whether the first and second washing units operate simultaneously and applies a control signal to the regeneration driving unit 190 so that the commercial power or the charging power of the battery 195 is supplied to the motor 131.

When the first washing unit and the second washing unit operate simultaneously, the power consumed in the laundry processing apparatus is increased, so that the controller 110 enables the motor to operate by using the charging power of the battery 195. In addition, when a heater (not shown) is provided, the controller 110 may control the heater to operate by supplying a charging power to the heater.

At this time, the controller 110 can determine whether the first and second washing units 140 and 150 operate simultaneously according to the intensity of the vibration measured by the detection unit 160. In addition, if water supply time is increased beyond a certain time, the controller 110 can determine whether the first and second washing units 140 and 150 operate simultaneously. In addition, the controller 110 may receive information on the amount of power consumption, and may determine that the first and second washing units operate when the power consumption increases beyond a certain value. In addition, the controller 110 can determine whether the first and second washing units 140 and 150 operate simultaneously based on the data mutually transmitted and received to/from the second washing unit 150 through the communication unit 180.

The controller 110 determines the charging state of the battery 195 in response to the voltage of the battery 195 measured through the voltage detection unit 161 and sets the operation power supplied to the motor. When the motor is braked, the controller 110 determines whether the battery 195 is charged, and applies a control signal to the regeneration driving unit 190.

That is, if the voltage of the battery 195 is equal to or greater than a certain magnitude, when the motor is driven, the controller 110 enables the charging power of the battery 195 to be supplied to the motor 131. If the voltage of the battery 195 is less than a certain magnitude, the controller 110 applies a control signal to the regeneration driving unit 190 so that the commercial power is supplied to the motor 131. Accordingly, the regeneration driving unit 190 operates according to the applied control signal so that any one of the commercial power and the charging power is supplied to the motor 131 and the motor driving unit 130.

In addition, when the motor is braked, the controller 110 applies a control signal to the regeneration driving unit 190 so that a current generated from the motor 131, i.e., a regenerative current, is supplied to the battery 195. At this time, the regeneration driving unit 190 operates according to the control signal to block the connection with a commercial power supply, and connect the battery and the motor to supply the current generated from the motor to the battery 195 to charge the battery.

Figure 4:
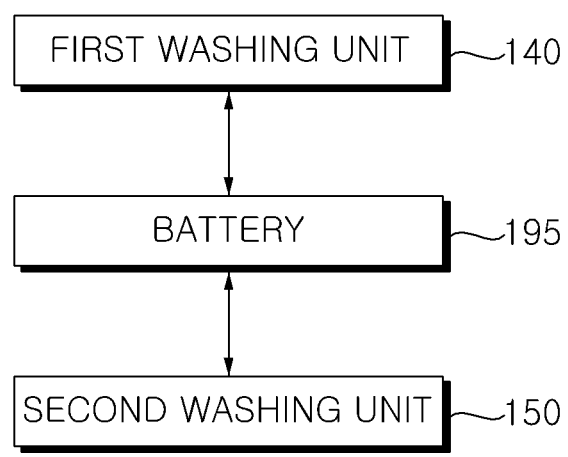
FIG. 4 is a diagram illustrating a configuration of a battery connection of a first washing unit and a second washing unit of a laundry processing apparatus according to an embodiment of the present invention.

FIG. 4 is a diagram illustrating a configuration of a battery connection of a first washing unit and a second washing unit of a laundry processing apparatus according to an embodiment of the present invention.

As shown in FIG. 4, the first and second washing units 140 and 150 may be connected to a single battery 195.

The battery 195 is supplied with an electric current from the motor 131 of the first washing unit 140 and a second motor (not shown) of the second washing unit 150 to be charged, and can supply the charging power to the first washing unit 140 and the second washing unit 150. Here, the first washing unit 140 and the second washing unit 150 are provided with the regeneration driving unit 190 for supplying or blocking the current to the battery 195, respectively. In some cases, when any one washing unit uses the charging power, the first washing unit 140 and the second washing unit 150 communicate with each other to use a commercial power for the other washing unit. Depending on the capacity of the battery 195, the first washing unit 140 and the second washing unit 150 may use the charging power at the same time.

At this time, when the first washing unit and the second washing unit operate simultaneously, the first controller 110 supplies the charging power of the battery 195 to any one of the first and second washing units which has an insufficient power.

In addition, the second washing unit 150 may include a separate second battery.

When a separate battery is provided in the second washing unit 150, the second washing unit 150 charges the second battery by using the current generated during braking of the second motor, and uses the charging current of the second battery 150 to drive the second motor.

Figure 5:
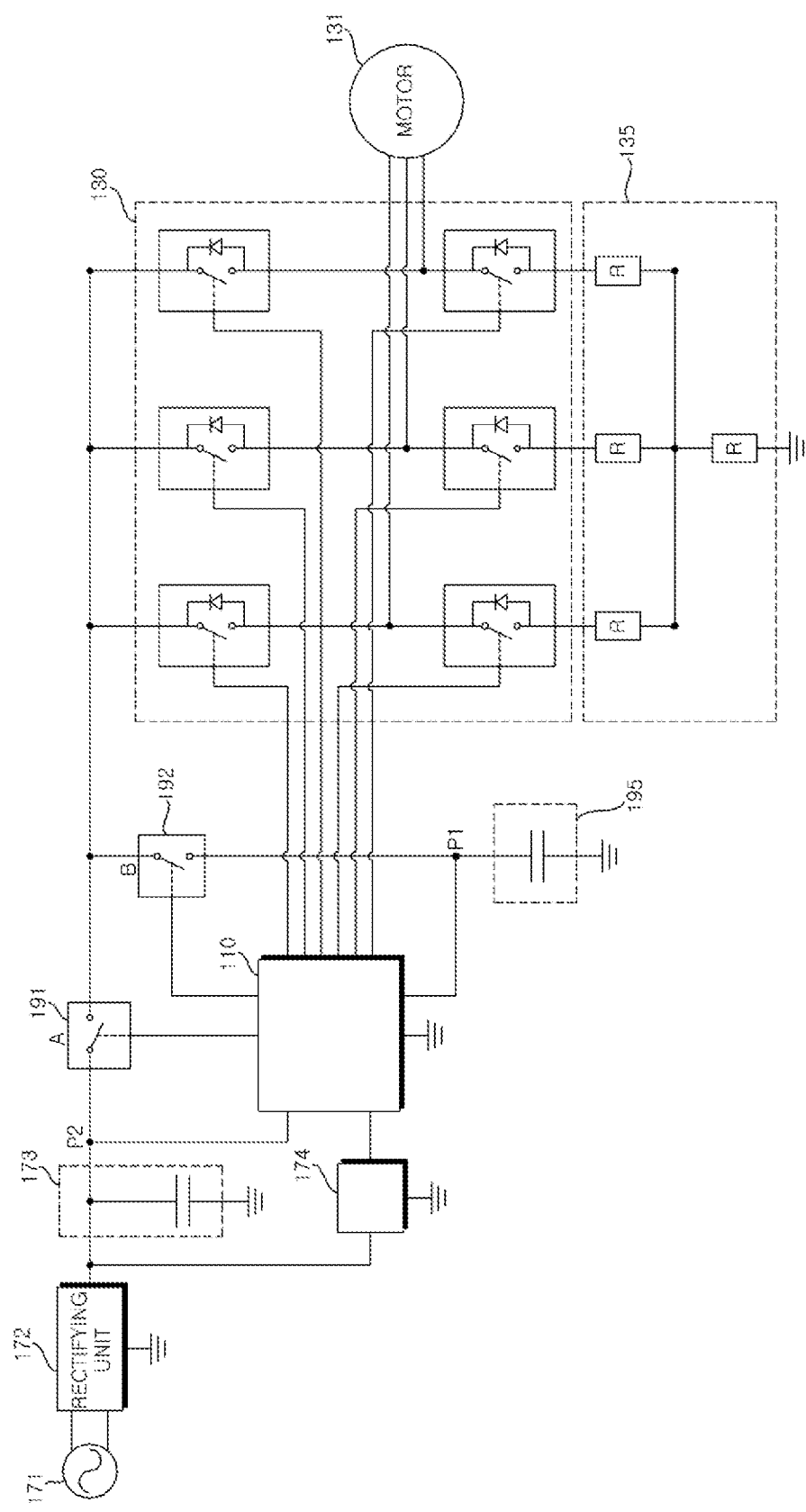
FIG. 5 is a circuit diagram for explaining a configuration of a control circuit for motor control of a laundry processing apparatus according to an embodiment of the present invention.

FIG. 5 is a circuit diagram for explaining a configuration of a control circuit for motor control of a laundry processing apparatus according to an embodiment of the present invention.

As shown in FIG. 5, a commercial power 171 is rectified through a rectifying unit 172, smoothed by a DC link unit 173, and supplied as an operating power for a motor or the like. The commercial power 171 is supplied to a SMPS 174, and the SMPS 174 generates a constant voltage of a certain magnitude and supplies the constant voltage to the controller 110.

The regeneration driving unit 190 includes a first switch A 191 and a second switch B 192, so that one of the commercial power and the charging power of the battery 195 is supplied to the motor 131, and the battery 195 is charged or the charging is stopped. At this time, the first switch A and the second switch B operate according to the control signal of the controller 110.

The voltage detection unit 161 is provided in a first point P1 of the battery 195 and the second switch B to detect the voltage of the battery 195. In addition, the voltage detection unit is also provided in a second point P2 connected to the DC link unit 173 to measure the voltage of the DC link unit and inputs the measured voltage to the controller 110.

The motor driving unit 130 includes a plurality of switches, and the plurality of switches operate according to a switching signal applied from the controller 110, thereby supplying operating power necessary for the driving of the motor 131. At this time, a plurality of load resistors 135 are connected to the motor driving unit 130.

One end of the first switch A 191 is connected to the DC link unit 173, and the other end of the first switch A 191 is connected to the motor driving unit 130 and the second switch B 192. One end of the second switch B 192 is connected to the first switch A 191 and the motor driving unit 130, and the other end of the second switch B 192 is connected to the battery 195.

When the commercial power is used, the controller 110 closes the first switch A 191 (first switch on), and opens the second switch B 192 (second switch off), so that the charging power is blocked and the commercial power is supplied to the motor 131. At this time, the commercial power is applied to the motor driving unit 130. As the motor driving unit 130 operates according to a switching signal, the operating power is supplied to the motor 131 to operate the motor. As the motor operates, the tub is rotated to perform washing.

Figure 6:
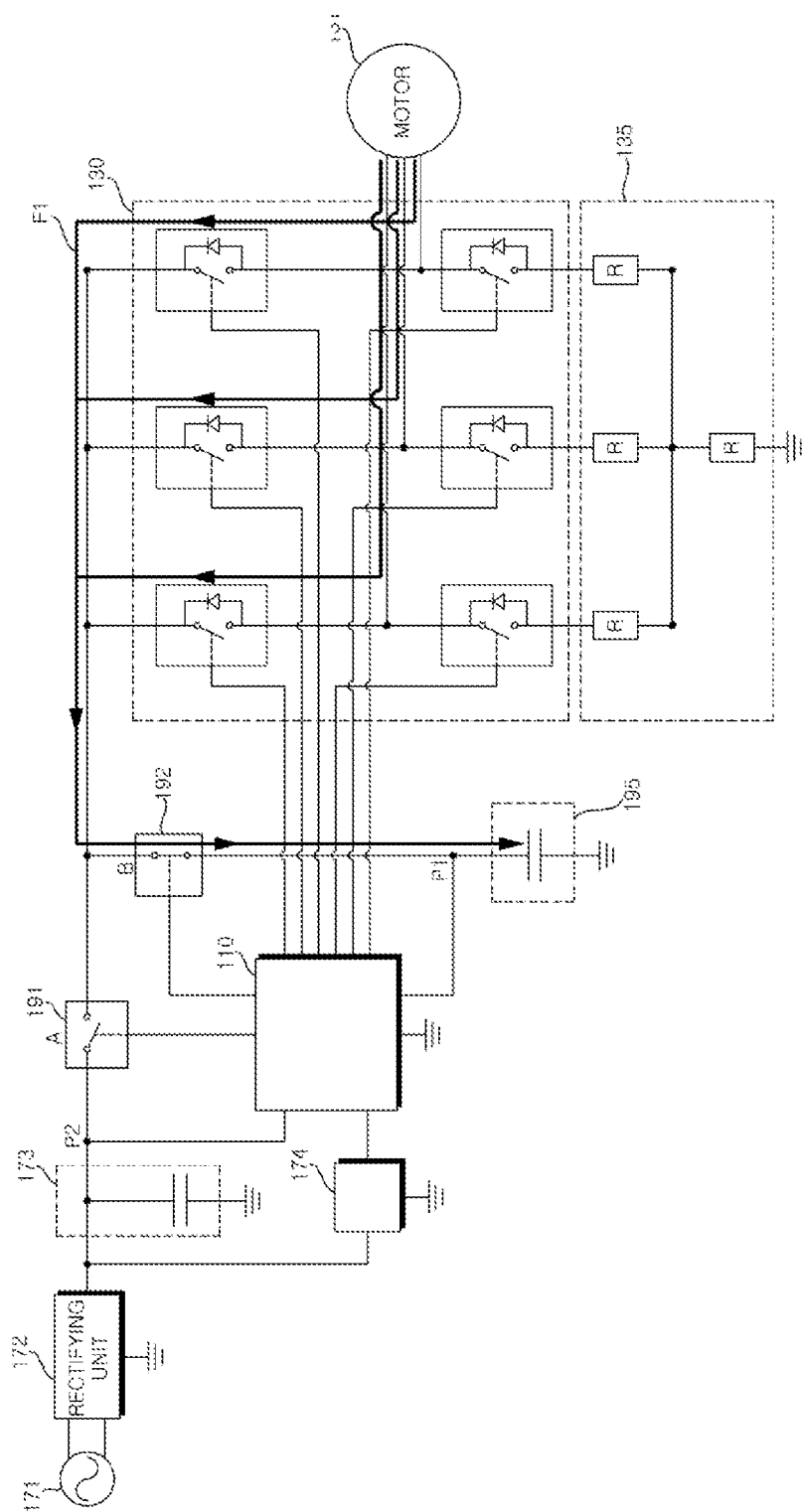
FIG. 6 is a diagram for explaining the charging by a regenerative current of the control circuit for motor control of FIG. 5.

FIG. 6 is a diagram for explaining the charging by a regenerative current of the control circuit for motor control of FIG. 5.

When the motor is braked, the controller 110 opens the first switch A 191 (first switch off), and closes the second switch B 192 (second switch on) so that the battery 195 and the motor driving unit 130 are connected. Thus, the current F1 generated by the motor is supplied to the battery 195 through the second switch B so that the battery 195 is charged.

At this time, when the motor is braked, the motor driving unit 130 blocks the power which is supplied to the motor as the first switch is opened, and applies the current generated by the motor to the battery 195 through a diode provided in the second switch.

The controller 110 determines the charging state of the battery according to the voltage of the battery 195 measured by the voltage detection unit 161, and determines whether the battery is charged to control the second switch B 192.

That is, when the motor is braked, when the charging of the battery 195 is completed or the battery 195 is overcharged, and the voltage of the battery 195 is higher than a preset voltage, the controller 110 applies a control signal such that the second switch B is opened so that the battery is no longer charged. At this time, the controller 110 opens also the first switch A for braking the motor to block the commercial power.

Thus, the current generated by the motor cannot be supplied to the battery, but is applied to the load resistor 135 connected to the motor driving unit 130 and consumed by the resistor.

Meanwhile, when the motor is started, the controller 110 determines the charging state of the battery 195. When the voltage of the battery is equal to or higher than a certain voltage, the controller opens the first switch A 191 and closes the second switch B so that the charging power of the battery 195 is supplied to the motor driving unit 130 through the second switch B. The motor driving unit 130 operates according to the switching signal of the controller and supplies the operating power to the motor 131, and accordingly, the motor rotates.

When the operation of motor by the charging power is not normally completed, the controller 110 applies a control signal to the first switch A and the second switch B so that the charging power of the battery is blocked and the commercial power is supplied to the motor.

Figure 7:
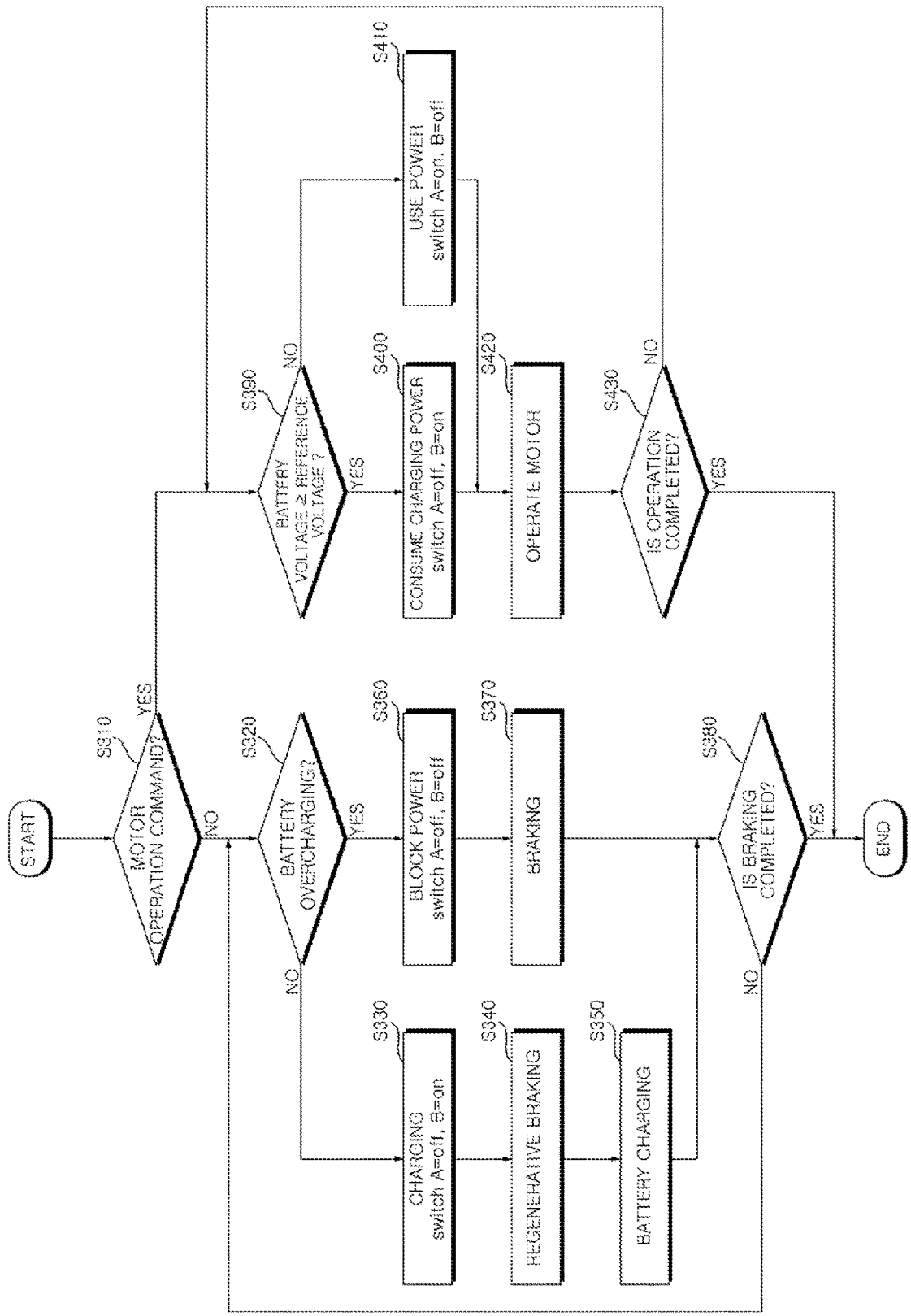
FIG. 7 is a flowchart illustrating a control method according to the charging and using of a rotating current of a laundry processing apparatus according to an embodiment of the present invention.

FIG. 7 is a flowchart illustrating a control method according to the charging and using of a rotating current of a laundry processing apparatus according to an embodiment of the present invention.

As shown in FIG. 7, when the wash setting is inputted and the water supply is performed, the first washing unit 140 drives the motor 131 to perform washing.

When operating the motor to perform washing, the controller 110 applies a motor operation command to the motor driving unit 130 (S310), and compares the voltage of the battery 195 measured through the voltage detection unit 161 with a reference voltage (S390).

When the voltage of the battery is equal to or higher than the reference voltage, the controller 110 generates a control signal to use the charging power and applies the control signal to the regeneration driving unit 190. At this time, the first switch A is opened (off), and the second switch B is closed (on), so that the commercial power is blocked, and the battery 195 and the motor driving unit 130 are connected to each other to supply the charging power to the motor (S400).

Accordingly, the motor is operated by the charging power (S420).

The controller 110 determines whether the motor operation is completed (S430). If the motor operation is not normally performed, the voltage of the battery is measured again through the voltage detection unit 161, and then is compared again with the reference voltage (S390).

When the voltage of the battery is less than the reference voltage, the controller 110 applies a control signal to supply commercial power so that the first switch A is closed and the second switch B is closed. Thus, the charging power is blocked and commercial power is supplied to the motor.

The motor 131 is operated by a commercial power (S420).

When the motor is operated normally, the controller 110 controls the motor according to the setting to perform washing.

Meanwhile, when the motor is stopped, i.e., when the motor is stopped during washing or rinsing, when the spin-dry is terminated, the controller 110 applies a motor stop command to the motor driving unit 130. Accordingly, the motor driving unit 130 blocks the power supplied to the motor, and stops the motor.

At this time, the controller 110 measures the voltage of the battery 195 through the voltage detection unit 161 to determine the charging state of the battery (S320).

If the charging of the battery is not completed as the voltage of the battery is less than a certain voltage, the controller 110 opens (OFF) the first switch A, and closes the second switch (ON) so as to supply the current applied from the motor during the motor braking to the battery 195. Thus, the battery 195 and the motor driving unit 130 are connected to allow the current to be applied to the battery 195 (S330).

The motor 131 is braked and stopped (S340). At this time, when the battery is charged by the current generated during the motor braking, it is called regenerative braking to be distinguished from the normal braking of the motor.

The current generated during the motor braking is applied to the battery, and the battery 195 is charged by the current of the motor, i.e., the regenerative current (S350).

When the braking is completed (S380), the controller 110 performs the following operation.

When the motor braking is not completed, the controller 110 brakes the motor, but as described above, determines the charging state of the battery and controls the switch of the regeneration driving unit to charge the battery when the charging of the battery is required (S320 to S350).

Meanwhile, when the charging of the battery 195 is completed, the controller 110 blocks the motor current supplied to the battery so that the battery is no longer charged (S360). At this time, the controller 110 opens both the first switch A and the second switch B to block the supply of the commercial power, and blocks the charging of the battery as well as the charging power of the battery.

As the supply of the operating power is blocked and braked, the motor 131 is stopped (S370).

When the motor 131 is stopped, the controller 110 determines that the braking is completed and performs the next operation.

Accordingly, the present invention provides a regeneration driving unit to charge the battery by the current generated from the motor when the motor is braked, and to supply the commercial power or the battery charging power according to the battery charging state during operation of the motor. Even if the power consumption is increased as the first washing unit and the second washing unit operate at the same time, the charging power can be used, thereby reducing energy consumption.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention is not construed as being limited to the described embodiments but is defined by the appended claims as well as equivalents thereto.

The invention claimed is:

1. A laundry processing apparatus comprising:
   a first washing unit which has a first tub and a first motor for operating the first tub; and
   a second washing unit which has a second tub and a second motor for operating the second tub, and operates independently of the first washing unit,
   wherein the first washing unit comprises:
   a battery which is charged by a current generated from the first motor, when the first motor is braked;
   a voltage detection unit which detects a voltage of the battery;
   a controller which enables the battery to be charged when the first motor is braked, determines a charging state of the battery in response to a voltage detected by the voltage detection unit, and controls charging power of the battery to be supplied to the first motor, when the first and second washing units operate simultaneously;
   a regeneration driving unit which supplies the current to the battery to charge the battery, or supplies the charging power to the first motor, according to a control command of the controller; and
   a motor driving unit which receives commercial power or the charging power to operate the first motor according to the control command of the controller.

2. The laundry processing apparatus of claim 1, wherein the controller controls the commercial power to be supplied to the first motor when the voltage of the battery is less than a set voltage in response to the voltage of the voltage detection unit.

3. The laundry processing apparatus of claim 1, wherein the controller stops the charging of the battery when it is determined that the battery is in an overcharged state in response to the voltage of the voltage detection unit.

4. The laundry processing apparatus of claim 1, wherein the regeneration driving unit comprises:
   a first switch for supplying any one of the commercial power and the charging power to the first motor in response to the control command of the controller; and
   a second switch for turning on and off the charging of the battery.

5. The laundry processing apparatus of claim 4, wherein the controller controls the second switch to charge the battery or stop the charging of the battery.

6. The laundry processing apparatus of claim 4, wherein the controller controls the first switch and the second switch such that any one of the charging power and the commercial power is supplied to the first motor as an operating power.

7. The laundry processing apparatus of claim 4, wherein the controller turns on the second switch and turns off the first switch so that the charging power of the battery is supplied to the first motor, and
   turns off the second switch and turns on the first switch so that the commercial power is supplied to the first motor.

8. The laundry processing apparatus of claim 4, wherein the motor driving unit comprises at least one resistor,
   wherein the controller turns off the first switch and the second switch, and applies a current generated from the motor to the resistor, when the battery is in an overcharged state.

9. The laundry processing apparatus of claim 4, wherein one end of the first switch is connected to a DC link unit of the commercial power and the other end of the first switch is connected to the second switch and the motor driving unit,
   wherein one end of the second switch is connected to the battery, and the other end of the second switch is connected to the first switch and the motor driving unit.

10. The laundry processing apparatus of claim 1, wherein the battery is connected to the second motor of the second washing unit,
    wherein the controller enables the charging power of the battery to be supplied to any one of the first and second washing units which has an insufficient power when the first washing unit and the second washing unit operate simultaneously.

11. The laundry processing apparatus of claim 10, wherein the second washing unit comprises:
    a second motor driving unit for operating the second motor by using the commercial power or the charging power; and
    a second controller for controlling the charging power to be supplied to the second motor in response to the control signal received from the controller.

12. The laundry processing apparatus of claim 11, wherein the second washing unit further comprises a third switch for enabling any one of the charging power and the commercial power of the battery to be supplied to the motor,
    wherein the second controller controls the third switch to select an operating power of the motor.

13. The laundry processing apparatus of claim 1, wherein the second washing unit comprises:

a second battery which is charged by a current generated from the second motor, when the second motor is braked;

a second voltage detection unit which detects a voltage of the second battery;

a second controller which enables the second battery to be charged when the second motor is braked, determines a charging state of the second battery in response to a voltage detected by the second voltage detection unit, and enables any one of the commercial power and charging power of the second battery to be supplied to the second motor; and a second motor driving unit which operates the second motor by using an operation power supplied from the commercial power or the charging power of the second battery, wherein the second controller determines whether the first washing unit and the second washing unit operate simultaneously and supplies the charging power of the second battery to the second motor in response to the control signal received from the controller.

14. A method for controlling a laundry processing apparatus laundry processing apparatus comprising a first washing unit which has a first tub and a first motor for operating the first tub, and a second washing unit which has a second tub and a second motor for operating the second tub and operates independently of the first washing unit, the method comprising:

braking the first motor which is in operation;

charging a battery by using a current generated from the first motor;

determining a charging state of the battery by measuring a voltage of the battery;

supplying a charging power of the battery to the first motor when the voltage of the battery is equal to or higher than a preset voltage and the first washing unit and the second washing unit operate simultaneously; and operating the first motor by the charging power.

15. The method of claim 14, wherein charging a battery comprises:

turning off a first switch connected to a commercial power and a motor driving unit for driving the first motor to block power supplied to the first motor;

turning on a second switch connected to the battery to connect the motor driving unit and the battery; and applying the current generated from the first motor to the battery.

16. The method of claim 15, further comprising turning on the first switch and turning off the second switch to supply the commercial power to the first motor when the voltage of the battery is less than the set voltage.

17. The method of claim 15, further comprising turning off the first switch and the second switch, and applying the current to a resistor connected to the motor driving unit, when the battery is overcharged.

18. The method of claim 14, further comprising supplying the charging power of the battery to the second motor connected to the battery, when the power of the second washing unit is insufficient.

* * * * *